(12) United States Patent
Lee et al.

(10) Patent No.: US 10,464,046 B2
(45) Date of Patent: Nov. 5, 2019

(54) FLUIDIZED BED WATER GAS SHIFT CATALYST

(75) Inventors: Joong Beom Lee, Daejeon-si (KR); Chong Kul Ryu, Daejeon-si (KR); Tae Hyoung Eom, Daejeon-si (KR); Dong Hyeok Choi, Daejeon-si (KR); Jeom In Baek, Daejeon-si (KR); Seong Jeagarl, Daejeon-si (KR); Seok Ran Yang, Daejeon-si (KR)

(73) Assignee: Korea Electric Power Corporation, Seoul (KR)

( * ) Notice: Subject to any disclaimer, the term of this patent is extended or adjusted under 35 U.S.C. 154(b) by 415 days.

(21) Appl. No.: 14/347,931

(22) PCT Filed: Jun. 11, 2012

(86) PCT No.: PCT/KR2012/004603
§ 371 (c)(1),
(2), (4) Date: Mar. 27, 2014

(87) PCT Pub. No.: WO2013/047978
PCT Pub. Date: Apr. 4, 2013

(65) Prior Publication Data
US 2014/0221193 A1    Aug. 7, 2014

(30) Foreign Application Priority Data

Sep. 30, 2011 (KR) .................. 10-2011-0100064

(51) Int. Cl.
*B01J 21/16* (2006.01)
*B01J 37/08* (2006.01)
(Continued)

(52) U.S. Cl.
CPC ............... *B01J 21/16* (2013.01); *B01J 2/04* (2013.01); *B01J 23/83* (2013.01); *B01J 29/072* (2013.01); *B01J 35/002* (2013.01); *B01J 37/08* (2013.01)

(58) Field of Classification Search
CPC ... B01J 21/16; B01J 21/04; B01J 21/12; B01J 2/04; B01J 23/83; B01J 29/072; B01J 35/002; B01J 37/08
(Continued)

(56) References Cited

U.S. PATENT DOCUMENTS 6,627,572 B1 * 9/2003 Cai .................... B01J 23/80
502/307
6,692,545 B2   2/2004 Gittleman et al.
(Continued)

FOREIGN PATENT DOCUMENTS

CN    1041968 A    5/1990
CN    1729050 A    2/2006
(Continued)

OTHER PUBLICATIONS

Carja et al., Fabrication of mesoporous mixed oxides containing copper and cerium by using substituted anionic clays as precursors, 2009, Materials Science—Poland, 27, 909-917.*
(Continued)

*Primary Examiner* — James A Fiorito
(74) *Attorney, Agent, or Firm* — Morgan, Lewis & Bockius LLP (57) ABSTRACT

The present invention relates to an aqueous gas-converting catalyst composition comprising: an active component; a support; an inorganic binder; at least one accelerator selected from the group consisting of cobalt oxide, molybdenum oxide, nickel oxide, calcium oxide, barium oxide, strontium oxide, magnesium oxide, zirconium oxide, man-
(Continued)

ganese oxide and barium titania; and at least one stabilizer selected from the group consisting of magnesium oxide, zirconium oxide, stabilized zirconia, and hydrotalcite. The catalyst according to the present invention can effectively capture and separate carbon dioxide due to the excellent physical properties thereof such as packing density and abrasion resistance, and high CO conversion. Also, according to the present invention, mass production is facilitated by applying a spraying technique, and overall costs are lowered because of high yield. Thus, the present invention can be applied as a low cost pre-combustion CO2 capturing technique to an integrated gasification combined cycle, fuel cells, coal liquefaction, compound production, and the like.

19 Claims, 5 Drawing Sheets

(51) Int. Cl.
  *B01J 2/04* (2006.01)
  *B01J 23/83* (2006.01)
  *B01J 29/072* (2006.01)
  *B01J 35/00* (2006.01)

(58) Field of Classification Search
  USPC .......................................... 502/63, 176, 159
  See application file for complete search history.

(56) References Cited

U.S. PATENT DOCUMENTS

| | | | |
|---|---|---|---|
| 6,777,117 | B1 | 8/2004 | Igarashi et al. |
| 7,083,658 | B2 | 8/2006 | Andrus, Jr. et al. |
| 7,354,562 | B2 | 4/2008 | Ying et al. |
| 2004/0180000 | A1 | 9/2004 | Hagemeyer et al. |
| 2005/0234137 | A1* | 10/2005 | Espinoza ............... B01J 21/04 |
| | | | 518/716 |
| 2005/0238574 | A1 | 10/2005 | Moon et al. |

FOREIGN PATENT DOCUMENTS

| | | |
|---|---|---|
| JP | 2000-262837 A | 9/2000 |
| JP | 2004-009011 A | 1/2004 |
| JP | 2004-275833 A | 10/2004 |
| JP | 2005-041749 A | 2/2005 |
| JP | 3782311 B2 | 6/2006 |
| JP | 2006-223985 A | 8/2006 |
| KR | 10-0386435 B1 | 6/2003 |
| KR | 10-2005-0103568 A | 11/2005 |
| WO | 2006/104805 A2 | 10/2006 |

OTHER PUBLICATIONS

International Search Report, w/ English translation thereof, issued in International Application No. PCT/KR2012/004603 dated Dec. 20, 2012.
Lee et al., Performance of Na2O promoted alumina as CO2 chemisorbent in sorption-enhanced reaction process for simultaneous production of fuel-cell grade H2 and compressed CO2 from synthesis gas, Journal of Power Sources 176 (2008) 312-319.
P.D. Cobden et al., "Sorption-enhanced hydrogen production for pre-combustion CO2 capture: Thermodynamic analysis and experimental results", International Journal of Greenhouse Gas Gontrol ?, p. 170-179, 2007.
Vanessa Guzmán-Velderrain et al., "Synthesis, Characterization and Evaluation of SodiumDoped Lithium Zirconate as a High Temperature CO2 Absorbent", Journal of New Materials for Electrochemicals Systems, vol. 11, p. 131-136, 2008.
Michael G. Beaver et al., "Selection of CO2 chemisorbent for fuel-cell grade H2 production by sorption-enhanced water gas shift reaction", International Journal of Hydrogen Energy, 34, p. 2972-2978, 2009.
Walspurger, S. et al., "The Crucial Role of the K+-Aluminium Oxide Interaction in K+-Promoted Alumina- and Hydrotalcite-Based Materials for CO2 Sorption at High Temperatures", ChemSusChem, vol. 1, No. 7, p. 643-650, 2008—English abstract.
Notice of the First Office Action Chinese Patent Application No. 201280047564.X dated Mar. 16, 2015 with full English translation.

* cited by examiner

| EXAMPLES | A | COMPARATIVE EXAMPLE 3 (ShiftMax 210) |
|---|---|---|
| CO CONVERSION RATIO | 99 (> 250°C) | 99 (> 220°C) |
| STEAM/CO RATIO | 2 | 2 |

| SHAPE | SPHERE | TABLET |
|---|---|---|
| APPLICABILITY TO FLUIDIZED BED | GOOD | BAD |
| SHAPES AFTER WEAR RESISTANCE TEST |  |  |

FIG. 8

FLUIDIZED BED WATER GAS SHIFT CATALYST

RELATED APPLICATIONS

This application is the U.S. National Phase under 35 U.S.C. § 371 of International Application No. PCT/KR2012/004603, filed on Jun. 11, 2012, which in turn claims the benefit of Korean Application No. 10-2011-0100064, filed on Sep. 30, 2011, the disclosures of which Applications are incorporated by reference herein.

TECHNICAL FIELD

The present disclosure relates to a fluidized bed water gas shift catalyst composition, a method of preparing a catalyst using the catalyst composition, and a catalyst prepared by the method.

BACKGROUND ART

Pre-combustion, in-combustion, and post-combustion techniques are used to capture carbon dioxide. In a pre-combustion carbon dioxide capturing method, various fossil fuels are partially oxidized (gasified) to produce a synthetic gas including hydrogen and carbon monoxide as main components, and the carbon monoxide is converted into hydrogen and carbon dioxide through a water gas shift reaction. Then, the hydrogen and the carbon dioxide are separated. Such a pre-combustion carbon dioxide capturing technique is used to capture carbon dioxide before a synthetic gas is used in various application fields (such as fuel cells, coal liquefaction, and compound production). In the pre-combustion carbon dioxide capturing technique, materials such as coal, biomass, and organic wastes may be used as raw materials instead of using petroleum which is relatively expensive and being exhausted, and produced synthetic gases may be used for various industrial fields such as power generation, fuel cells, synthetic material production. In addition, since carbon dioxide is collected at high temperature and high pressure, collection of carbon dioxide may less affect the efficiency of other processes, and carbon dioxide collecting costs may be markedly reduced because costs necessary for compressing carbon dioxide are reduced. Pre-combustion $CO_2$ capturing techniques, such as a pressure swing adsorption (PSA) process and other common-use techniques using a physical sorbent such as Selexol and Rectisol, have low thermal efficiency due to low process temperature and requires a large amount of energy because of the necessity of a large amount of regeneration energy. Particularly, common-use wet process techniques require at least four steps such as two water gas shift steps, a heat exchange step, and a low temperature $CO_2$ absorption step, and additionally, at least two compression steps for storing $CO_2$ collected at low pressure. Furthermore, since the temperature of $CO_2$-removed fuel gas is low, the fuel gas has to be reheated at a front side of a gas turbine, increasing costs and lowering efficiency. Techniques of using a separation film allow high-pressure operations and thus guarantee high energy efficiency. However, such techniques are not suitable for large-scale industrial processes because of low processing capacity.

A sorption enhanced water gas shift (SEWGS) technique may be used to effectively separate and capture $CO_2$ from a synthetic gas generated by a gasifier while maintaining the $CO_2$ at high temperature and high pressure. Since a $CO_2$ collecting process can be performed together with a water gas shift (WGS) process by using the SEWGS technique, a CO conversion ratio may be improved, and since high-concentration $CO_2$ can only be separated during a regeneration process by using the SEWGS technique, the SEWGS technique may be used as a pre-combustion $CO_2$ capturing technique aimed to use pollution-free clean energy.

A fixed bed SEWGS technique for collecting $CO_2$ after modifying natural gas has been developed in Europe. However, the technique is complex, requires up to seven processes, and is not suitable for continuous operation. Therefore, the technique has limitations for being used as a pre-combustion $CO_2$ collecting technique for large-scale industrial processes such as an integrated gasification combined cycle (IGCC) process.

However, according to a fluidized bed SEWGS technique, conversion/absorption-regeneration is possible in a one-loop process, and collection of a large amount of $CO_2$ is also possible.

According to the fluidized bed SEWGS technique, an absorbent and a catalyst are continuously circulated between two fluidized bed reactors to produce high-concentration hydrogen by simultaneously causing a CO conversion reaction and a $CO_2$ capturing reaction in one of the reactors, and to separate high-concentration $CO_2$ in the other of the reactors by applying steam and heat to the absorbent in which $CO_2$ is captured to regenerate the absorbent. Since the catalyst and the absorbent are circulated continuously and repeatedly between the two reactors, the fluidized bed SEWGS technique is suitable for continuous operation and large-scale industrial processes such as an IGCC process. Since solid particles are used in the technique, waste water is little produced, and various inexpensive materials may be used owing to low corrosion. In addition, since absorbents can be regenerated and reused, the technique is attractive as future technology for collecting $CO_2$ and producing hydrogen at low cost.

Such an SEWGS technique is disclosed in JP 3782311. In the disclosed technique, a catalyst including lithium silicate and a composite of iron oxide and chromium oxide are used, and methods such as a supporting method are used for preparing the catalyst. In U.S. Pat. Nos. 6,692,545 and 7,354,562, potassium carbonate, magnesium, manganese oxide, lanthanum oxide, or clay is proposed as an absorbent; an iron-chromium oxide catalyst is proposed as a high-temperature conversion catalyst; methods such as a supporting method are proposed as methods of preparing thereof. U.S. Pat. No. 7,083,658 proposes a potassium-oxide absorbent as a high-temperature absorbent but does not state about a catalyst, and JP 2000-262837 and JP 2005-041749 proposes various lithium-compound absorbents and iron-chromium oxide composite catalysts.

Recent technical papers relating to SEWGS are ChemSusChem., 2008, 1. 643-650, International Journal of Hydrogen Energy, 2009, 34, 2972-2978, Journal of New Materials for Electrochemicals Systems, 2008, 11, 131-136, International Journal of Greenhouse gas control I, 2007, 170-179, Journal of Power Sources, 2008, 176, 312-319, etc. The papers disclose research into optimal multi-step SEWGS processes using commercial low-temperature or high-temperature conversion catalysts (e.g., Sud-chemie) and absorbents prepared by adding additives to hydrotalcite containing magnesium and alumina.

Unlike the present disclosure, the above-mentioned patents and papers mainly propose: techniques for using commercial fixed bed catalysts or preparing fixed bed catalysts; combinations of various active materials, supports, and additives as absorbents; and preparing methods such as physical mixing methods and supporting methods. In addition, techniques proposed in such patents and papers are not suitable for preparing large amounts of catalysts and absorbents for fluidized bed processes, and are not suitable for processes in which a catalyst and an absorbent are continuously circulated between two fluidized bed reactors to collect $CO_2$.

DISCLOSURE

Technical Problem

An aspect of the present disclosure may provide a technique of effectively capturing and separating carbon dioxide from a synthetic gas through a fluidized enhanced water gas shift reaction, the technique being usable in various fields such as integrated gasification combined cycle processes, fuel cells, coal liquefaction, and compound synthesis such as hydrogen synthesis.

If catalysts used in the related art for a fixed bed sorption enhanced water gas shift reaction are used for fluidized bed sorption enhanced water gas shift processes, problems relating to the particle sizes and wear of the catalysts may occur. Therefore, another aspect of the present disclosure may provide a catalyst suitable for fluidized bed processes.

Another aspect of the present disclosure may provide a catalyst satisfying fluidized bed process conditions (such as particle sizes, particle size distributions, strength, and filling density) and usable under high-temperature (200° C. to 650° C.), high-pressure (20 bars to 40 bars) synthetic gas process conditions.

Technical Solution

According to an aspect of the present disclosure, a water gas shift reaction catalyst composition may include: an active component; a support; an inorganic binder; at least one promoter selected from the group consisting of cobalt oxide, molybdenum oxide, nickel oxide, calcium oxide, barium oxide, strontium oxide, manganese oxide, and barium titania; and at least one stabilizer selected from the group consisting of magnesium oxide, zirconium oxide, stabilized zirconia, and hydrotalcite.

The active component may include a transition metal oxide or a component convertible into a transition metal oxide.

The active component may be included in a range of 10 parts by weight to 90 parts by weight based on 100 parts by weight of the water gas shift reaction catalyst composition.

The support may include at least one material selected from the group consisting of alumina, hydrotalcite, zirconia, yttria-stabilized zirconia, titania, silica, and ceramics.

The alumina may have a specific surface area of 150 $m^2/g$ to 250 $m^2/g$, and the hydrotalcite may include 30 parts by weight to 60 parts by weight of magnesium hydroxide.

The support may be included in a range of 3 parts by weight to 70 parts by weight based on 100 parts by weight of the water gas shift reaction catalyst composition.

The inorganic binder may include at least one selected from the group consisting of clays and ceramics.

The clays may include bentonite or kaolin, and the ceramics include an alumina sol, a silica sol, or boehmite.

The inorganic binder may be included in a range of 3 parts by weight to 70 parts by weight based on 100 parts by weight of the water gas shift reaction catalyst composition.

The promoter and the stabilizer may be included in a range of 3 parts by weight to 70 parts by weight based on 100 parts by weight of the water gas shift reaction catalyst composition.

According to another aspect of the present disclosure, a slurry composition may include: 25 parts by weight to 50 parts by weight of the water gas shift reaction catalyst composition of any one of claims 1 to 10; and a solvent.

The slurry composition may further include at least one organic additive selected from the group consisting of a dispersant, a defoamer, and an organic binder.

The dispersant may include at least one selected from the group consisting of anionic dispersants, cationic dispersants, amphoteric dispersants, and nonionic dispersants.

The defoamer may include a metallic soap-based or polyester-based nonionic surfactant.

The organic binder may include at least one selected from the group consisting of polyvinyl alcohols, polyglycols, and methylcellulose.

According to another aspect of the present disclosure, a method of preparing a water gas shift reaction catalyst may include: (A) forming solid particles by spraying and drying the slurry composition of claim 11; and (B) drying and firing the solid particles.

The slurry composition may be prepared by: preparing a mixture of a solvent and a solid raw material; adding an organic additive to the mixture, the additive including at least one selected from the group consisting of dispersants, defoamers, and organic binders; and agitating and pulverizing the mixture.

After the agitating and pulverizing of the mixture, the mixture may have an average particle diameter of 0.01 μm to 3 μm.

The method may further include removing foreign substances from the slurry composition after the agitating and pulverizing.

The drying of the solid particles may be performed in an air atmosphere at a temperature of 110° C. to 150° C.

The firing of the solid particles may be performed at a temperature of 350° C. to 1000° C. in an atmosphere of air, nitrogen, helium, hydrogen, steam, or a reducing gas.

According to another aspect of the present disclosure, a water gas shift reaction catalyst may be prepared by the above-described method.

The water gas shift reaction catalyst may have an average particle size of 60 μm to 180 μm, a particle size distribution of 30 μm to 330 μm, a filling density of 0.5 g/cc to 2.0 g/cc, a wear resistance of 70% or less, and a CO conversion ratio of 60% or higher.

Advantageous Effects

The catalyst of the present disclosure satisfies fluidized bed process conditions and $CO_2$ absorbent conditions such as spherical shapes, average particle sizes, particle size distributions, filling density, and wear resistance. In addition, the catalyst of the present disclosure has a high CO conversion ratio and guarantees high hydrogen production yield. Therefore, the catalyst of the present disclosure may be used to easily convert carbon monoxide included in a synthetic fossil fuel gas into carbon dioxide and hydrogen, and to easily capture the carbon dioxide. In addition, a large amount of the catalyst may be easily produced with a high yield at low cost by using a spraying technique. Thus, the catalyst may be used as a low-cost, pre-combustion $CO_2$ collecting catalyst in fields requiring apparatuses such as fuel cells and processes such as integrated gasification combined cycle processes, coal liquefaction processes, and compound production processes. Furthermore, since the catalyst of the present disclosure can be used under high-temperature, high-pressure synthetic gas process conditions, a decrease of efficiency caused by $CO_2$ collection may be minimized, and costs required for compressing $CO_2$ may be markedly reduced. That is, $CO_2$ may be treated at low cost by using the catalyst of the present disclosure.

BEST MODE

An embodiment of the present disclosure relates to a water gas shift reaction catalyst composition including: an active component; a support; an inorganic binder; at least one promoter selected from the group consisting of cobalt oxide, molybdenum oxide, nickel oxide, calcium oxide, barium oxide, strontium oxide, manganese oxide, and barium titania; and at least one stabilizer selected from the group consisting of magnesium oxide, zirconium oxide, stabilized zirconia, and hydrotalcite.

Hereinafter, the water gas shift reaction catalyst composition will be described with reference to the accompanying drawings.

Figure 1:
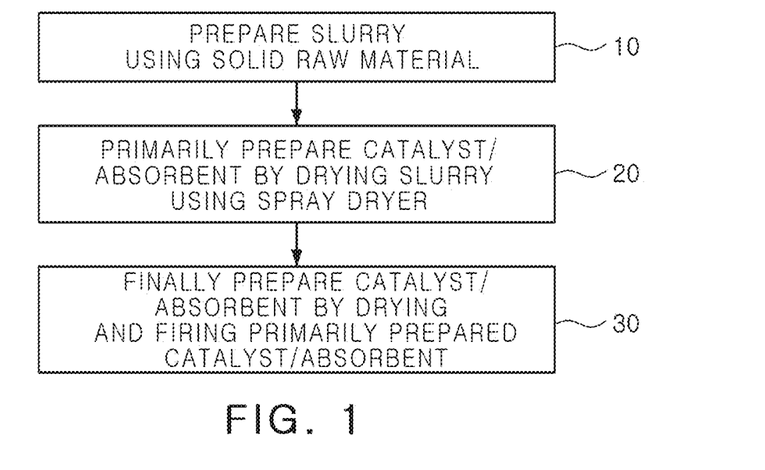
FIG. 1 is flowchart illustrating operations for preparing a water gas shift reaction catalyst according to an embodiment of the present disclosure.

FIG. 1 is flowchart for illustrating operations for preparing a water gas shift reaction catalyst according to an embodiment of the present disclosure.

Referring to FIG. 1, the water gas shift reaction catalyst may be prepared by a method including: preparing slurry by mixing a solid raw material with a solvent (operation 10); forming solid particles by spraying and drying the slurry (operation 20); and drying and firing the solid particles (operation 30).

Figure 2:
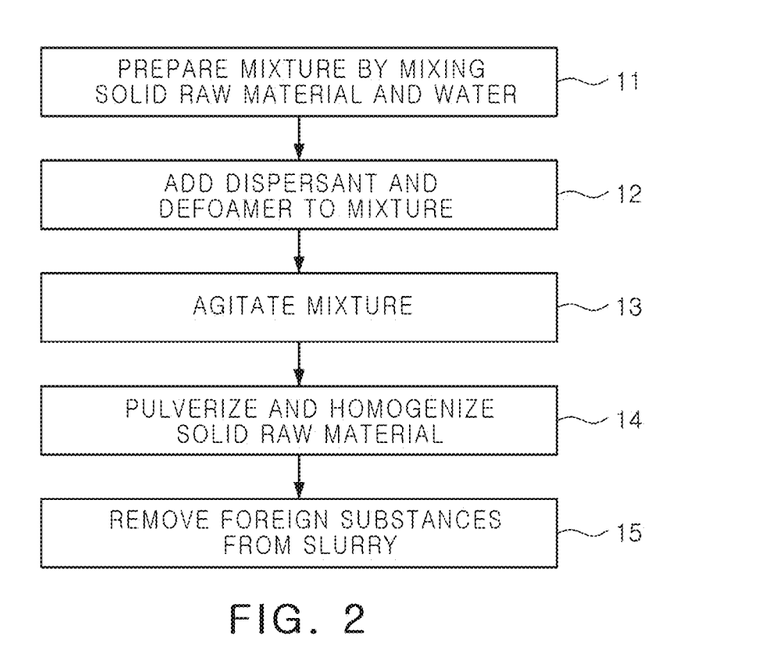
FIG. 2 is a flowchart illustrating operations for preparing slurry using a mixture of a solid raw material and a solvent.

FIG. 2 is a flowchart illustrating operations for preparing slurry using a mixture of a solid raw material and a solvent according to the embodiment of the present disclosure.

Referring to FIG. 2, slurry may be prepared by: preparing a mixture of a solid raw material and water (solvent) (operation 11); adding additives such as an organic additive to the mixture (operation 12); agitating the mixture (operation 13); pulverizing and homogenizing the solid raw material (operation 14); and removing foreign substances from the slurry (operation 15).

The organic additive may be at least one of a dispersant, a defoamer, and an organic binder or may include all the listed substances.

Figure 3:
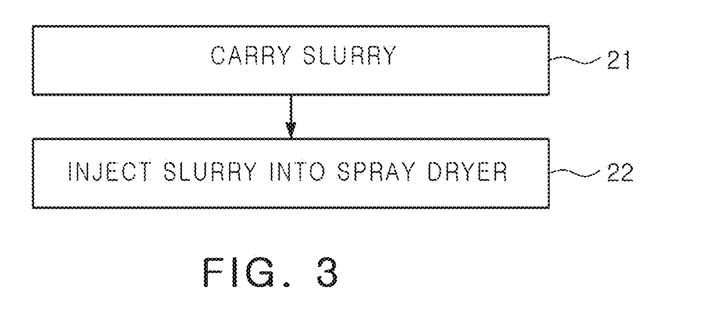
FIG. 3 is a flowchart illustrating operations for forming solid particles by spraying and drying slurry.

FIG. 3 is a flowchart illustrating operations for forming solid particles by spraying and drying slurry.

Referring to FIG. 3, operations for forming solid particles by spraying and drying slurry may include: carrying slurry to a spray dryer (operation 21); and injecting the slurry into the spray dryer (operation 22).

Figure 4:
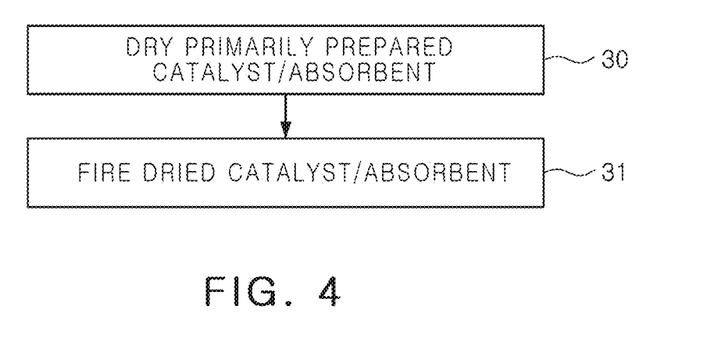
FIG. 4 is flowchart illustrating operations for preparing a catalyst by drying and firing solid particles prepared by a spraying-drying method.
Figure 5A:
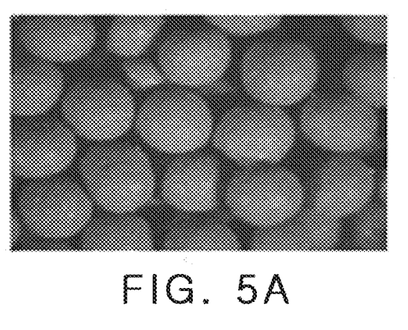
FIG. 5 is SEM image of catalysts prepared according to examples of the present disclosure.
Figure 5B:
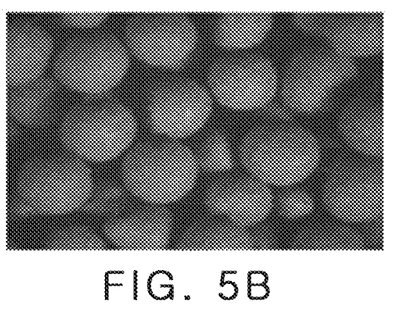
Figure 5C:
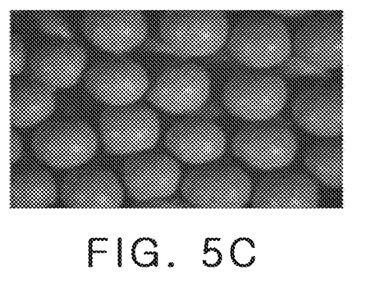
Figure 5D:
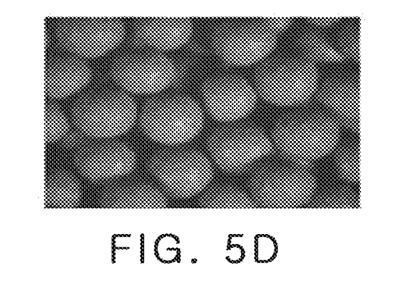
Figure 5E:
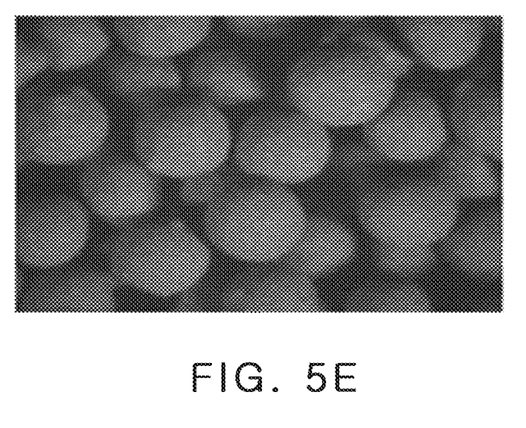

FIG. 4 is flowchart illustrating operations for preparing a catalyst by drying and firing solid particles prepared by a spraying-drying method.

Referring to FIG. 4, particles primarily dried in a spraying-drying operation undergoes drying operation 31 and then firing operation 32.

As described above, the water gas shift reaction catalyst composition of the embodiment of the present disclosure includes an active component, a support, an inorganic binder, a stabilizer, and a promoter.

In the embodiment of the present disclosure, the active component of the catalyst composition causes a reaction between water and carbon monoxide included in a synthetic gas for producing hydrogen and carbon dioxide. The active component may be a transition metal oxide or a component convertible into a transition metal oxide. For example, the active component may include at least one material selected from the group consisting of copper oxide (CuO), zinc oxide (ZnO), iron oxide ($Fe_3O_4$), chromium oxide ($Cr_2O_3$), cerium oxide ($CeO_2$), nickel oxide (NiO), Cobalt oxide (CoO), molybdenum oxide ($MoO_3$), and manganese (MnO). In another example, the active component may include at least one material selected from the group consisting of copper oxide, zinc oxide, and cerium oxide.

In the embodiment of the present disclosure, the concentration of the active component is not limited to a particular value. For example, the concentration of the active component may range from 10 parts by weight to 90 parts by weight, preferably, from 10 parts by weight to 70 parts by weight, based on 100 parts by weight of the catalyst composition. If the concentration of the active component is lower than 10 parts by weight, the conversion ratio of carbon monoxide may be lowered, and if the concentration of the active component is greater than 90 parts by weight, physical characteristics (e.g., wear resistance and filling density) necessary for a fluidized sorption enhanced water gas shift reaction process may be deteriorated.

In the embodiment of the present disclosure, the purity of the active component may be 98% or higher.

In the embodiment of the present disclosure, the support of the catalyst composition facilitates distribution of the active component into catalyst particles for improving the function of the active component, and provides pores and a surface area necessary for a reaction. The support is not limited to a particular type thereof, as long as the support has a large specific surface area. For example, the support may include at least one material selected from the group consisting of alumina, hydrotalcite, zirconia, yttria-stabilized zirconia, titania, silica, and ceramics. In another example, the support may include at least one material selected from the group consisting of alumina, zirconia, and yttria-stabilized zirconia. The alumina may have an $Al_2O_3$ concentration of about 99.8% and a specific surface area of 150 $m^2/g$ to 250 $m^2/g$. The hydrotalcite may have a magnesium hydroxide ($Mg(OH)_2$) concentration of 20% or more and a specific surface area of 100 $m^2/g$ or more.

In the embodiment of the present disclosure, the concentration of the support is not limited to a particular value. For example, the concentration of the support may range from 3 parts by weight to 70 parts by weight, preferably, from 5 parts by weight to 60 parts by weight, for 100 parts by weight of the catalyst composition. If the concentration of the support is lower than 3 parts by weight, physical characteristics such as wear resistance and filling density necessary for a fluidized sorption enhanced water gas shift reaction process may be deteriorated. If the concentration of the support is greater than 70 parts by weight, the concentration of the active component may be relatively lowered, and thus the function of the active component may be lowered.

In the embodiment of the present disclosure, the inorganic binder of the catalyst composition is used to combine the active component and the support so as to enhance the strength of the catalyst and make it possible to use the catalyst for a long period of time without loss caused by wear. In the embodiment of the present disclosure, the inorganic binder is not limited to a particular type. For example, the inorganic binder may include at least one selected from the group consisting of clays and ceramics. Examples of the clays may include bentonite and kaolin, and examples of the ceramics may include alumina sol, silica sol, and boehmite.

In the embodiment of the present disclosure, the concentration of the inorganic binder is not limited to a particular value. For example, the concentration of the inorganic binder may range from 3 parts by weight to 70 parts by weight, preferably, from 3 parts by weight to 60 parts by weight, based on 100 parts by weight of the catalyst composition. If the concentration of the inorganic binder is lower than 3 parts by weight, physical properties may be deteriorated because of a low binding force between materials of the catalyst composition, and if the concentration of the inorganic binder is greater than 70 parts by weight, the function of the catalyst may be lowered because the concentration of the active component is relatively lowered.

In the embodiment of the present disclosure, the promoter of the catalyst composition improves the function of the catalyst and makes it possible to repeatedly use the catalyst for a long period of time without a decrease in reactivity. The promoter may include at least one material selected from the group consisting of cobalt oxide ($CoO_3$), molybdenum oxide ($MoO_3$), nickel oxide (NiO), calcium oxide (CaO), barium oxide (BaO), strontium oxide ($SrO_2$), manganese oxide (MnO), and barium titania ($BaTiO_3$). For example, the promoter may include at least one material selected from the group consisting of nickel oxide, manganese oxide, and barium titania.

In the embodiment of the present disclosure, owing to the stabilizer included in the catalyst composition, the catalyst may stably maintain activity in high-temperature (200° C. to 650° C.), high-pressure (20 bars to 40 bars), and reducing-atmosphere conditions. The stabilizer may include at least one material selected from the group consisting of magnesium oxide (MgO), zirconium oxide ($ZrO_2$), stabilized zirconia (yitria-stabilized zirconia), and hydrotalcite. For example, the stabilizer may be hydrotalcite.

In the embodiment of the present disclosure, the concentration of the promoter and the stabilizer is not limited to a particular value. For example, the concentration of the promoter and the stabilizer may range from 3 parts by weight to 70 parts by weight, preferably, from 3 parts by weight to 60 parts by weight, based on 100 parts by weight of the catalyst composition. If the concentration of the promoter and the stabilizer is lower than 3 parts by weight, the effects of the promoter and the stabilizer may be very low, and if the concentration of the promoter and the stabilizer is greater than 70 parts by weight, the function of the catalyst may be lowered because the concentration of the active component is relatively lowered.

In addition, an embodiment of the present disclosure relates to a slurry composition including a solvent and a solid raw material. The solid raw material is the above-described catalyst composition including the active component, the support, the inorganic binder, the promoter, and the stabilizer.

In the embodiment of the present disclosure, the above-described materials may be used as the active component, the support, the inorganic binder, the promoter, and the stabilizer, within the above-described concentration ranges thereof.

In the current embodiment of the present disclosure, the solvent is not limited thereto a particular type. Any solvent generally used in the related art may be used. For example, water or alcohol may be used as the solvent. In another example, water may be used as the solvent.

In the embodiment of the present disclosure, the concentration of the solid raw material included in the slurry composition may range from 25 parts by weight to 50 parts by weight, preferably, from 25 parts by weight to 40 parts by weight. If the concentration of the solid raw material is lower than 25 parts by weight, the amount of the slurry composition necessary for preparing a catalyst may be increased, and thus preparation efficiency may be lowered. If the concentration of the solid raw material is greater than 50 parts by weight, the viscosity of the slurry composition may be increased to lower fluidity. Thus, it may be difficult to carry the slurry composition using a pump during a spaying and drying process, and workability may be lowered.

The slurry composition may further include an additive providing plasticity and dispersibility when the solid raw material is mixed with water (solvent). The additive may include at least one organic additive selected from the group consisting of a dispersant, a defoamer, and an organic binder to adjust the homogeneity of the solid raw material, and the concentration, viscosity, stability, fluidity, strength, and density of the slurry composition.

In the embodiment of the present disclosure, the additive may include a dispersant, a defoamer, and an organic binder.

In the embodiment of the present disclosure, the dispersant is used to prevent coagulation of particles during a pulverizing process. That is, during a pulverizing process for controlling the particle size of the solid raw material constituting a catalyst, the dispersant may prevent pulverized powder particles from coagulating and thus may improve pulverizing efficiency.

In the embodiment of the present disclosure, the dispersant may include at least one material selected from the group consisting of an anionic dispersant, a cationic dispersant, an amphoteric dispersant, and a nonionic dispersant. For example, the dispersant may be an anionic dispersant. Examples of the anionic dispersant include polycarboxylic acid, polycarboxylic acid-amine, polycarboxylic acid amine salt, and polycarboxylic acid sodium salt.

The concentration of the anionic dispersant may range from 0.1 parts by weight to 10 parts by weight based on the solid raw material. In the above-mentioned range, dispersion of particles may be facilitated.

In the embodiment of the present disclosure, the defoamer may be used to remove bubbles from the slurry composition including the dispersant and the organic binder. For example, the defoamer may be a metallic soap-based or polyester-based nonionic surfactant.

The concentration of the defoamer may range from 0.01 parts by weight to 0.2 parts by weight based on the solid raw material.

The organic binder may be used to provide plasticity and fluidity to the slurry composition and thus to strengthen solid particles formed through a spraying and drying process.

Therefore, the solid particles may be easily treated before a drying and firing process. In the embodiment of the present disclosure, the organic binder may include at least one material selected from the group consisting of polyvinyl alcohols, polyglycols, and methylcellulose.

For example, the concentration of the organic binder may range from 0.5 parts by weight to 5 parts by weight based on the solid raw material. If the concentration of the organic binder is lower than 0.5 parts by weight, solid particles formed through a spraying and drying process may have a low binding force and thus may not remain in a spherical shape until a drying and firing process is performed. If the concentration of the organic binder is greater than 5 parts by weight, the performance of a final material may be lowered because of a residue of the organic binder remaining after a firing process.

In the embodiment of the present disclosure, a pH controlling agent may be additionally used to adjust the pH of the slurry composition. Examples of the pH controlling agent may include organic amine and an ammonia solution.

In the present disclosure, a method of preparing a water gas shift reaction catalyst is not limited.

According to an embodiment of the present disclosure, a water gas shift reaction catalyst may be prepared by a method including: forming solid particles by spraying and drying the above-described slurry composition (operation A); and drying and firing the solid particles (operation B).

In operation A, the slurry composition may be prepared by mixing the above-described solid raw material with a solvent.

The solid raw material may include an active component, a support, an inorganic binder, a promoter, and a stabilizer. The aforementioned materials may be used as the active component, the support, the inorganic binder, the promoter, and the stabilizer, within the aforementioned concentration ranges.

The slurry composition is prepared by:

preparing a mixture of a solvent and the solid raw material;

adding an organic additive to the mixture, the additive including at least one selected from the group consisting of a dispersant, a defoamer, and an organic binder; and agitating and pulverizing the mixture.

In the preparing of the mixture, any one of the aforementioned materials may be used the solvent. For example, water may be used as the solvent.

In addition, the concentration of the solid raw material may range from 25 parts by weight to 50 parts by weight based on the slurry composition.

In the adding of the organic additive to the mixture, the organic additive may include at least one selected from the group consisting of a dispersant, a defoamer, and an organic binder. For example, the organic additive may include a dispersant, a defoamer, and an organic binder. In addition, a pH controlling agent may be additionally added to the mixture.

The aforementioned materials may be used as the dispersant, the defoamer, and the organic binder, within aforementioned ranges.

The agitating of the mixture may be performed while adding components to the mixture and/or after all components are added to the mixture. The agitating of the mixture may be performed using an agitator. Any kind of agitator may be used. For example, a mechanical stirrer, a double helix mixer, a high-speed emulsifying machine, a homogenizer), a high shear blender, or an ultrasonic homogenizer may be used.

Through the pulverizing of the mixture, solid raw material particles may be finely pulverized and homogeneously dispersed. In the embodiment of the present disclosure, during the pulverizing of the mixture, a defoamer and a dispersant may be additionally used, and a pH controlling agent may also be additionally used, so as to prepare a stable slurry composition.

In the embodiment of the present disclosure, a wet milling method may be used to improve pulverizing effects and prevent problems of a dry milling method such as particle blowing.

The pulverizing of the mixture may be performed using a pulverizer such as a roller mill, a ball mill, an attrition mill, a planetary mill, a bead mill, or a high energy bead mill. In the embodiment of the present disclosure, for example, the high energy bead mill may be used.

If the high energy bead mill is used, when the mixture is pulverized and homogenized, the filling amount of beads (milling medium) may be 60% to 80% of the volume of a mill housing. The beads used as a milling medium may be yttria-stabilized zirconia beads having high strength and stability. The size of the beads may range from 0.3 mm to 1.25 mm.

The pulverizing of the mixture may be performed twice or more times for preparing a homogeneous slurry composition. For the next pulverizing after a pulverizing process, a dispersant and a defoamer may be added to the mixture (slurry composition) to adjust the fluidity thereof and thus to easily carry the slurry composition using a pump.

In addition, before final pulverizing, an organic binder may be added so as to homogeneously mix the slurry composition.

After the pulverizing, the mixture (slurry composition) may have an average particle diameter of 0.01 µm to 3 µm. If the average particle diameter is smaller than 0.01 µm, the solid raw material included in the mixture may coagulate and thus may come to having low dispersibility, and if the average particle diameter is greater than 3 µm, the solid raw material may have low homogeneity. Preferably, the average particle diameter may range from 0.05 µm to 1 µm.

After pulverizing, the properties of the slurry composition such as concentration and viscosity may be adjusted using a dispersant, a defoamer, or a solvent.

If the particle diameter of the solid raw material is several micrometers or less, the solid raw material may not be pulverized.

After the slurry composition is prepared, foreign substances may be removed from the slurry composition through an additional process. Through the additional process, foreign substances or coagulated portions that may clog a nozzle during a spraying process may be removed from the slurry composition. Such foreign substances may be removed by a sifting method or a vacuum sifting method.

The fluidity (viscosity) of the slurry composition is not limited to a particular level as long as the slurry composition can be transferred using a pump.

The forming of the solid particles by spraying and drying the slurry composition may be performed using a spray dryer.

For example, the slurry composition may be carried to a spray dryer using a pump and injected into the spray dryer using, for example, the pump, so as to dry the slurry composition to form solid particles. For example, the slurry composition may have a viscosity of 300 cP or greater when the slurry composition is carried and injected using a pump.

Operational conditions of the spray dryer for forming the solid particles may be the same as those generally used in the related art.

In addition, the slurry composition may be sprayed using a pressurizing nozzle in a direction opposite to the direction of a dry air stream (this is known as a counter-current method). That is, a pressurizing nozzle may be disposed in a lower side of the spray dryer (a counter-current fountain configuration) so as to control the average particle size of the solid particles and increase the stay time of the solid particles in the spray dryer.

The shape, particle size, particle size distribution, and structure of the solid particles are affected by the concentration, viscosity, dispersed degree, injection pressure, and injection amount of the slurry composition, and the capacity and temperature of the spray dryer. Therefore, the structure and spraying method of the spray dryer may be properly selected to obtain desired properties of the solid particles.

In the embodiment of the present disclosure, the injection pressure of the spray dryer may range from 5 kg/cm$^2$ to 15 kg/cm$^2$, and the inner diameter of the pressurizing nozzle may range from 0.4 mm to 1.6 mm. In addition, the temperature of the spray dryer may range from 260° C. to 300° C. at an entrance thereof, and from 90° C. to 150° C. at an exit thereof.

The particle size of the solid particles may range from 30 μm to 330 μm.

According to the embodiment of the present disclosure, in operation B, the solid particles formed in operation A are dried and fired to form a catalyst.

In the embodiment of the present disclosure, the drying of the solid particles may be performed at a temperature of 110° C. to 150° C. by using a circular dryer for 2 or more hours. At this time, the drying may be performed in an air atmosphere.

After the drying, the solid particles may be put into a high-temperature firing furnace, and the temperature of the firing furnace may be increased to a temperature of 350° C. to 1000° C. at a rate of 0.5° C./min to 10° C./min. At the temperature, the solid particles may be fired for 2 or more hours. Before the firing furnace reaches a final firing temperature, the firing furnace may stay at a constant temperature two or more times for 30 minutes or longer.

The firing furnace may be a muffle furnace, a tubular furnace, or a kiln.

In the embodiment of the present disclosure, the firing may be performed by any method such as a method of firing the solid particles after fluidizing the solid particles, a method of firing the solid particles without fluidizing the solid particles, or a method of firing the solid particles while circulating the solid particles in a cylindrical firing furnace such as a rotary kiln.

Furthermore, in the embodiment of the present disclosure, the firing may be performed at a temperature of 350° C. to 1000° C. in an atmosphere of air, nitrogen, helium, hydrogen, steam, or a reducing gas. At this time, the flow rate of the atmospheric gas may be varied according to the type and size of the firing furnace. For example, the flow rate of the atmospheric gas may be 60 ml/min or greater. The maximum of the flow rate of the atmospheric gas is not limited.

In the embodiment of the present disclosure, during the firing of the solid particles, the organic additive (dispersant, defoamer, and organic binder) added when the slurry composition is prepared is burned, and components of the solid particles are combined together to improve the strength of the solid particles.

In addition, an embodiment of the present disclosure relates to a water gas shift reaction catalyst. In the embodiment of the present disclosure, the water gas shift reaction catalyst is prepared using the above-mentioned catalyst composition including an active component, a support, an organic binder, a promoter, and a stabilizer.

In the embodiment of the present disclosure, the catalyst may have a spherical particle shape. If the catalyst has a donut-like particle shape or a shape having a groove, wear of the catalyst may be increased.

The catalyst may have a particle size of 60 μm to 180 μm and a particle size distribution of 30 μm to 330 μm.

The filling density of the catalyst may range from 0.5 g/cc to 2.0 g/cc.

In the present disclosure, wear resistance is expressed in attrition index (AI). A lower value of the attrition index means a higher degree of wear resistance. The wear resistance of the catalyst is not limited. For example, the wear resistance of the catalyst may be 70% or less. If the wear resistance of the catalyst is greater than 70%, a large amount of fine particles may be generated, and thus it may be difficult to use the catalyst in a fluidized bed sorption enhanced water gas shift process.

Furthermore, in the embodiment of the present disclosure, at a temperature of 300° C. or greater, the catalyst may have a carbon monoxide (CO) conversion ratio of 60% or greater, preferably 80% or greater, more preferably 90% or greater, and most preferably 95%. The CO conversion ratio is a rate of conversion form carbon monoxide and water into carbon dioxide and hydrogen.

Furthermore, an embodiment of the present disclosure relates to a fluidized bed sorption enhanced water gas shift method including: a first operation of capturing carbon dioxide using an absorbent while converting carbon monoxide into carbon dioxide and hydrogen by using a catalyst; and a second operation of regenerating the absorbent in which carbon dioxide is captured. The catalyst may be the catalyst described in the description given above.

A synthetic gas produced using a gasifier may include carbon monoxide and hydrogen as main components.

In the first operation, carbon monoxide included in such a synthetic gas undergoes a reaction with water and is thus converted into carbon dioxide and hydrogen as expressed by Reaction Formula 1 below.

$$CO+H_2O \rightarrow CO_2+H_2 \qquad \text{<Formula 1>}$$

Conversion of the carbon monoxide may be activated by the catalyst. As described above, the catalyst may be prepared by the above-described preparation method using a catalyst composition including an active component, a support, an inorganic binder, a promoter, and a stabilizer.

Carbon dioxide produced as described above may be captured using the absorbent. The absorbent is not limited to a particular type thereof. For example, any absorbent generally used in the related art may be used.

In the second operation, the absorbent in which carbon dioxide is captured is regenerated. The regeneration of the absorbent may be performed by reacting the absorbent with steam.

That is, the absorbent may be regenerated by applying steam and heat to the absorbent to separate carbon dioxide from the absorbent.

In the embodiment of the present disclosure, the regenerated absorbent may be reused in the first operation to capture carbon dioxide.

MODE FOR INVENTION

Hereinafter, the scope and spirit of the present disclosure will be described in more detail through examples of the present disclosure and comparative examples. However, the scope and spirit of the present disclosure are not limited thereto.

Example 1

8 kg of a solid raw material was prepared by using 40 parts by weight of copper oxide (CuO) as an active component, 22 parts by weight of cerium oxide ($Ce_2O$), 5 parts by weight of gamma alumina ($\gamma$-$Al_2O_3$) as a support, 3 parts by weight of yttria-stabilized zirconia, 5 parts by weight of bentonite as an inorganic binder, 20 parts by weight of hydrotalcite as a stabilizer, and 5 parts by weight of manganese oxide as a promoter.

A slurry mixture was prepared by adding the solid raw material to water while agitating the water. The concentration of the solid raw material was 24.6 parts by weight based on 100 parts by weight of the slurry mixture. Before the solid raw material was added, a small amount of dispersant was added so as to facilitate the mixing and dispersion of the solid raw material, or while the solid raw material was added, a small amount of dispersant was added according to the viscosity and agitating state of the slurry mixture. A small amount of defoamer was added after the dispersant was added or was added while the slurry was agitated, so as to remove bubbles therefrom.

The slurry was sufficiently agitated using a double helix agitator at a speed of 10,000 rpm to 25,000 rpm for 10 minutes or longer, so as to prevent sedimentation of particles of the solid raw material having a relatively high specific weight or size.

After the agitating, the slurry was treated in a high energy bead mill twice or more times so as to pulverize and homogenize particles of the solid raw material. In this manner, preparation of the slurry was completed. During the agitating of the slurry, water, a dispersant, a defoamer, and a pH controlling agent (organic amine) were added so as to adjust properties such as the viscosity of the slurry, the concentration of the solid raw material, and the pH of the slurry, or so as to easily agitate the slurry. Poly ethyl glycol was homogeneously dispersed into the slurry as an organic binder before final pulverizing.

After the property controlling, the final slurry was sifted to remove foreign substances that might have included in the slurry.

A catalyst was prepared by drying the slurry using a dryer in an air atmosphere at 120° C. for 2 hours or longer, heating the slurry in a muffle furnace to a final firing temperature of 500° C. to 650° C. at a rate of 0.5° C./min to 10° C./min, and keeping the slurry at the final temperature for 2 or more hours.

Before the slurry reaches the final firing temperature, the slurry was kept at 200° C., 400° C., and 500° C. respectively for 1 hour, so as to effectively remove an organic additive and an organic binder added to the slurry during preparation of the slurry.

Concentrations of components used to form the catalyst, properties of the slurry are shown in Table 1.

Examples 2 and 3, and Comparative Examples 1 and 2

Catalysts were prepared in the same manner as in Example 1 except for the concentrations of components and slurry properties as shown in Table 1.

Comparative Example 3

Shiftmax 210 (by Sud-Chimie) was used.

TABLE 1

|  |  | *E1 | E2 | **CE1 | CE2 | E3 | CE3 (Shift max 210) | CE4 | CE5 |
|---|---|---|---|---|---|---|---|---|---|
| Active component (parts by weight) | CuO | 40 | 40 | 40 | 40 | 40 | 58 | 40 | 40 |
|  | ZnO |  |  |  |  | 30 | 31 |  |  |
|  | $CeO_2$ | 22 | 22 | 20 | 10 |  |  | 20 | 22 |
| Support (parts by weight) | $\gamma$-Alumina | 5 | 5 | 5 | 5 | 5 | 11 | 5 | 23 |
|  | $ZrO_2$ |  |  | 30 | 40 | 4 |  | 5 | 5 |
|  | Yttria-stabilized zirconia | 3 | 3 |  |  |  |  |  |  |
| Stabilizer (parts by weight) | Hydrotalcite (Plural MG30) | 20 | 20 |  |  | 10 |  | 25 |  |
| Inorganic binder (parts by weight) | Bentonite | 5 | 5 | 5 | 5 | 4 |  | 5 | 5 |
|  | Pseudo-boehmite |  |  |  |  | 3 |  |  |  |
| Promoter (parts by weight) | $BaTiO_3$ |  |  |  |  | 4 |  |  |  |
|  | NiO |  | 5 |  |  |  |  |  | 5 |
|  | MnO | 5 |  |  |  |  |  |  |  |
| Total solid raw material (parts by weight) |  | 100 | 100 | 100 | 100 | 100 | 100 | 100 | 100 |
| Nonionic dispersant (parts by weight) |  | 0.01 to 0.1 | | | | | | | |
| Anionic dispersant (parts by weight) |  | 0.1 to 3 | | | | | | | |
| Defoamer (parts by weight) |  | 0.01 to 0.1 | | | | | | | |
| Organic binder (parts by weight) |  | 1.0 to 5.0 | | | | | | | |
| Slurry concentration (parts by weight) |  | 24.6 | 28.6 | 30.9 | 30.2 | 31.6 | — | 32 | 31 |
| Slurry pH |  | 10.33 | 9.42 | 8.70 | 8.66 | 10.3 | — | 9.4 | 9.3 |
| Viscosity (cP) |  | 44,260 | 46,730 | 1,900 | 2,606 | 62,600 | — | 42,000 | 3,000 |

*E: Example,
**CE: Comparative Example

Experimental Examples

1) Measurement of Catalyst Shapes

The shapes of the catalysts were measured by naked eye, an industrial microscope, or a scanning electron microscope (SEM).

2) Measurement of Average Particle Sizes and Particle Size Distributions

The average particle sizes and particle size distributions of the catalysts were measured by ASTM E-11 (standard sifting method). 10 g of each catalyst sample was sifted using a sieve shaker for 30 minutes, and the average particle sizes and particle size distributions of the catalyst samples were calculated by a calculation method stated in ASTM E-11.

3) Measurement of Filling Densities

The filling densities of the catalysts were measured using an apparatus and method stated in standard ASTM D 4164-88.

4) Measurement of Wear Resistance (AI)

The wear resistance values of the catalysts were measured using a wear measurement apparatus (3-hole attrition tester) prepared according to ASTM D 5757-95 and test methods and procedures stated in ASTM D 5757-95.

Each attrition index (AI) value calculated by a method stated in ASTM was a ratio of the amount of fine powder captured after a sample was worn in a wear tube at a flow rate of 10 slpm (standard liters per minute) for 5 hours to the initial amount of the sample (50 g). Attrition index is one of important process conditions (for fluidized bed or high-speed fluidized bed processes) and is favored to be 30% or less in (fluidized bed) processes. As the attrition index (AI) has a low value, wear resistance is high.

5) Measurement of CO Conversion Ratios

Co conversion reactions facilitated by the catalysts were tested in a batch fluidized bed reactor (2 cm ID). CO conversion ratios were measured at reaction conditions of 20 bars and 300° C. to 420° C. Gas including, by volume %, 29.8% of carbon monoxide, 13.4% of hydrogen, 4.9% of carbon dioxide, and 59.1% of nitrogen as a balancing gas was used in the reactions. Water (steam) was added to the gas at a water:carbon monoxide ratio of 1:1 to 5:1 for a water gas shift reaction.

Measured properties of the catalysts prepared in the examples and the comparative examples are shown in Table 2 below.

tive Example 2, and Example 3, respectively. As shown in FIGS. 5A to 5E, the catalysts prepared according to the present disclosure have a spherical shape.

Figure 6:
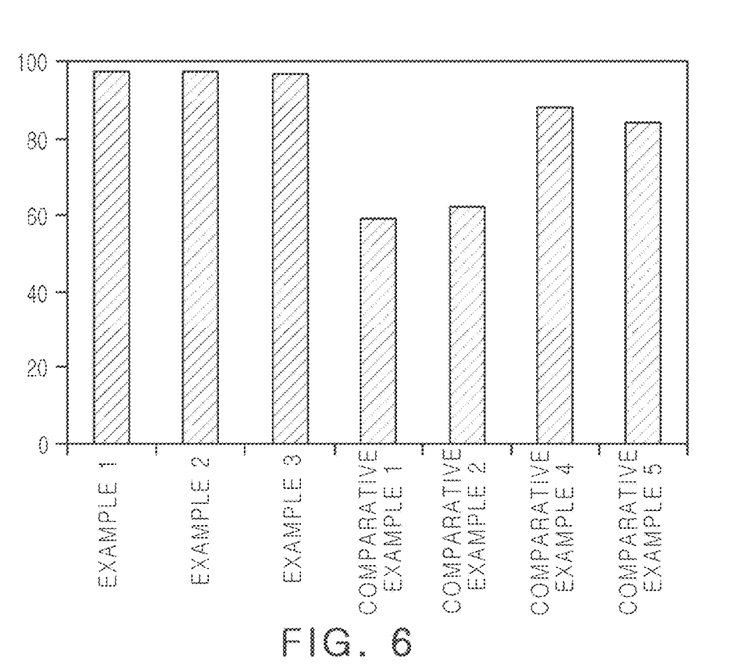
FIGS. 6 to 8 are graphs showing CO conversion ratios of catalysts prepared according to examples of the present disclosure.

FIG. 6 is a graph showing ratios of conversion of carbon monoxide into hydrogen (CO conversion ratios) measured at a water (steam):carbon monoxide ratio of 1:3 at a temperature of 300° C. by using the catalysts prepared in the examples and the comparative examples. The catalysts of the examples prepared using a stabilizer and a promoter have higher CO conversion ratios at 300° C. than those of the catalysts prepared not using a stabilizer and a promoter (Comparative Examples 1 to 3). In addition, the catalysts of Comparative Examples 4 and 5 prepared respectively using a stabilizer and a promoter have CO conversion ratios of 90% or lower, which are higher than those of the catalysts prepared not using any one of the stabilizer and the promoter, but are lower than those of the catalysts of the examples prepared using both the stabilizer and the promoter. The catalysts of the examples have CO conversion ratios of 97% or higher.

Figure 7:
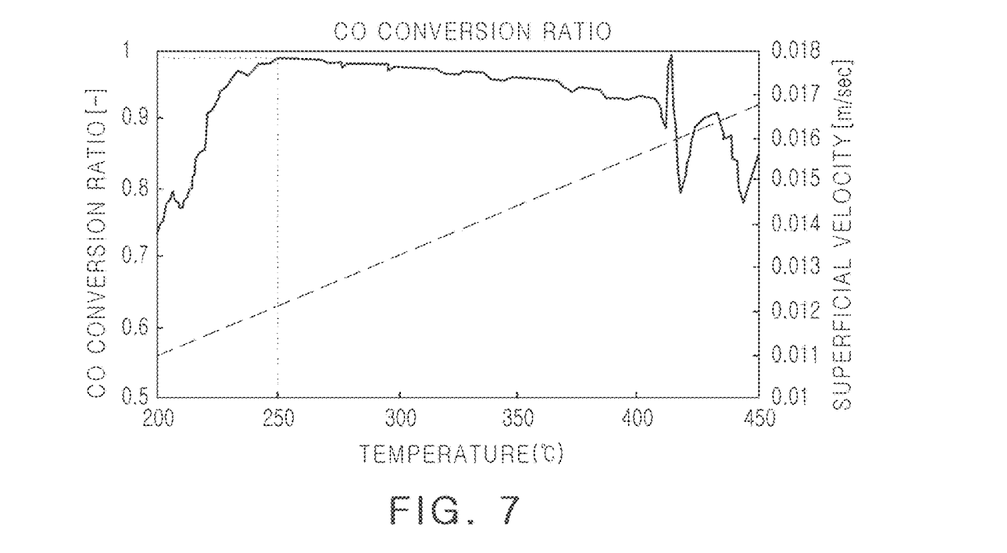

FIG. 7 is a graph showing the CO conversion ratio of the catalyst of Example 1 measured at a water (steam):carbon monoxide ratio of 1:2. In the measurement, temperature was increased at a rate of 1° C./min, and the maximum value of the CO conversion ratio was 99% or higher at 250° C. That is, the catalyst of Example 1 has high performance.

Figure 8:
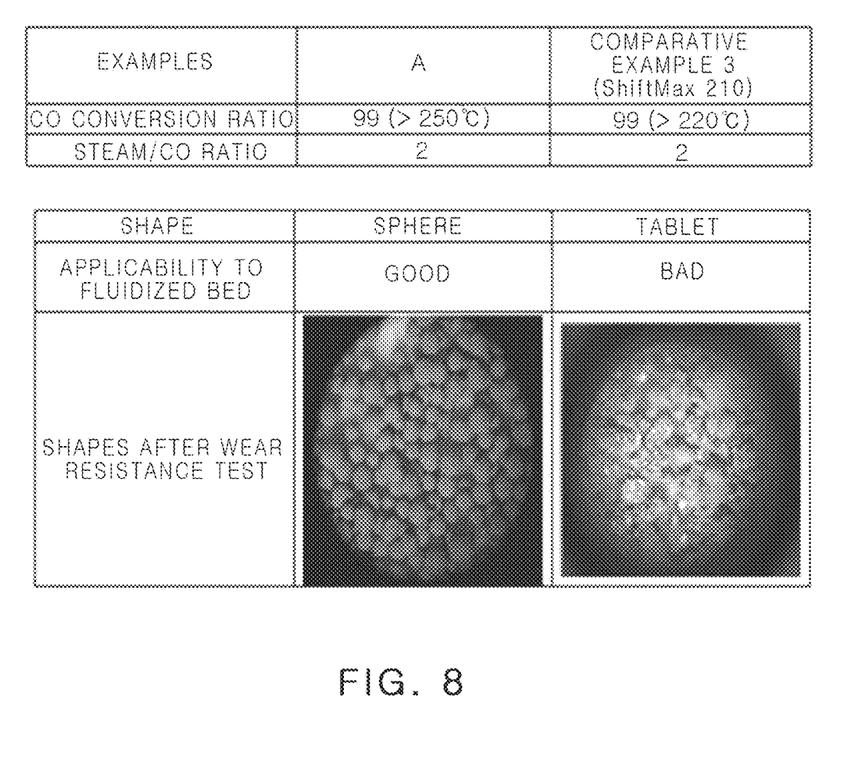

FIG. 8 shows the CO conversion ratio of the catalyst (A) of Example 1 in comparison with the CO conversion ratio of the catalyst of Comparative Example 3. As shown in FIG. 8, the catalyst of Comparative Example 3 may be considered to have a high CO conversion ratio if used as a commercial fixed bed catalyst. However, the catalyst of Comparative Example 3 is not suitable as a catalyst for high-speed fluidized bed processes.

The invention claimed is:

1. A water gas shift reaction catalyst composition comprising:
   an active component including copper oxide (CuO) and cerium oxide ($CeO_2$), and including at least one selected from the group consisting of cobalt oxide, nickel oxide, molybdenum oxide and barium titania;
   at least one support selected from the group consisting of alumina having a specific surface area of 150 $m^2/g$ to 250 $m^2/g$, and hydrotalcite comprising 30 parts by weight to 60 parts by weight of magnesium hydroxide;

TABLE 2

|  | *E1 | E2 | CE1 | **CE2 | E3 | CE3 | CE4 | CE5 |
| --- | --- | --- | --- | --- | --- | --- | --- | --- |
| Shape | ***S | S | S | S | S | Tablet | S | S |
| Particle size (μm) | 140 | 149 | 113 | 129 | 110 | 4.8 × 3.2 mm | 126 | 115 |
| Particle size distribution μm | 71-250 | 71-250 | 56-224 | 63-250 | 37-303 | — | 45-250 | 45-250 |
| Filling density g/ml | 0.85 | 0.96 | 1.24 | 1.29 | 0.80 | — | 0.95 | 0.91 |
| Wear resistance % | 42 | 39 | — | — | 46 | — | 42 | 36 |
| Final firing Temp. | 550 | 550 | 550 | 550 | 550 | — | 550 | 550 |

*E: Example,
**CE: Comparative Example,
***S: sphere

Referring to Table 2, the catalysts prepared according to the examples of the present disclosure satisfy physical properties required in fluidized bed processes.

FIGS. 5A to 5E are SEM images of the catalysts prepared according to the examples of the present disclosure and the comparative examples. In detail, FIGS. 5A, 5B, 5C, 5D, and 5E are SEM images of the catalysts prepared according to Example 1, Example 2, Comparative Example 1, Comparaat least one inorganic binder selected from the group consisting of bentonite, kaolin, an alumina sol, a silica sol, and boehmite; and
   a stabilizer formed of hydrotalcite comprising 30 parts by weight to 60 parts by weight of magnesium hydroxide.

2. The water gas shift reaction catalyst composition of claim 1, wherein the active component is included in a range of 10 parts by weight to 90 parts by weight based on 100 parts by weight of the water gas shift reaction catalyst composition.

3. The water gas shift reaction catalyst composition of claim 1, wherein the support is included in a range of 3 parts by weight to 70 parts by weight based on 100 parts by weight of the water gas shift reaction catalyst composition.

4. The water gas shift reaction catalyst composition of claim 1, wherein the inorganic binder is included in a range of 3 parts by weight to 70 parts by weight based on 100 parts by weight of the water gas shift reaction catalyst composition.

5. The water gas shift reaction catalyst composition of claim 1, wherein a promoter and the stabilizer are included in a range of 3 parts by weight to 70 parts by weight based on 100 parts by weight of the water gas shift reaction catalyst composition.

6. A slurry composition comprising: 25 parts by weight to 50 parts by weight of the water gas shift reaction catalyst composition of claim 1; and a solvent.

7. The slurry composition of claim 6, further comprising at least one organic additive selected from the group consisting of a dispersant, a defoamer, and an organic binder.

8. The slurry composition of claim 7, wherein the dispersant comprises at least one selected from the group consisting of anionic dispersants, cationic dispersants, amphoteric dispersants, and nonionic dispersants.

9. The slurry composition of claim 7, wherein the defoamer comprises a metallic soap-based or polyester-based nonionic surfactant.

10. The slurry composition of claim 7, wherein the organic binder comprises at least one selected from the group consisting of polyvinyl alcohols, polyglycols, and methylcellulose.

11. A method of preparing a water gas shift reaction catalyst, the method comprising:
(A) forming solid particles by spraying and drying the slurry composition of claim 6; and
(B) drying and firing the solid particles.

12. The method of claim 11, wherein the slurry composition is prepared by:
preparing a mixture of a solvent and a solid raw material;
adding an organic additive to the mixture, the additive comprising at least one selected from the group consisting of dispersants, defoamers, and organic binders; and
agitating and pulverizing the mixture.

13. The method of claim 12, wherein after the agitating and pulverizing of the mixture, the mixture has an average particle diameter of 0.01 gm to 3 pm.

14. The method of claim 12, further comprising removing foreign substances from the slurry composition after the agitating and pulverizing.

15. The method of claim, 11, wherein the drying of the solid particles of (B) is performed in an air atmosphere at a temperature of 110° C. to 150° C.

16. The method of claim 11, wherein the firing of the solid particles of (B) is performed at a temperature of 350° C. to 1000° C. in an atmosphere of air, nitrogen, helium, hydrogen, steam, or a reducing gas.

17. The water gas shift reaction catalyst comprising the water gas shift reaction catalyst composition of claim 1, wherein the water gas shift reaction catalyst has an average particle size of 60 μm to 180 pm, a particle size distribution of 30 gm to 330 pm, a filling density of 0.5 g/cc to 2.0 g/cc, a wear resistance of 70% or less, and a CO conversion ratio of 60% or higher.

18. The water gas shift reaction catalyst composition of claim 1, wherein the active component is included in a range of 10 parts by weight to 70 parts by weight based on 100 parts by weight of the water gas shift reaction catalyst composition.

19. The water gas shift reaction catalyst composition of claim 1, wherein the at least one support is included in a range of 5 parts by weight to 60 parts by weight based on 100 parts by weight of the water gas shift reaction catalyst composition.

* * * * *